(12) United States Patent
Eberlein

(10) Patent No.: US 11,358,620 B2
(45) Date of Patent: Jun. 14, 2022

(54) TRANSPORT MEANS WITH AT LEAST ONE TRANSPORT DEVICE AND METHOD FOR PRODUCING, OPERATING, AND SERVICING THE TRANSPORT MEANS

(71) Applicant: Martin Eberlein, Sofia (BG)

(72) Inventor: Martin Eberlein, Sofia (BG)

( * ) Notice: Subject to any disclaimer, the term of this patent is extended or adjusted under 35 U.S.C. 154(b) by 155 days.

(21) Appl. No.: 17/046,749

(22) PCT Filed: Feb. 22, 2019

(86) PCT No.: PCT/DE2019/000045
§ 371 (c)(1),
(2) Date: Oct. 9, 2020

(87) PCT Pub. No.: WO2019/166038
PCT Pub. Date: Sep. 6, 2019

(65) Prior Publication Data
US 2021/0163052 A1     Jun. 3, 2021

(30) Foreign Application Priority Data

Mar. 2, 2018 (DE) .................... 20 2018 001 120.7
Mar. 10, 2018 (DE) .................... 20 2018 001 297.1
(Continued)

(51) Int. Cl.
*B62B 3/00*        (2006.01)
*B62B 3/14*        (2006.01)
(Continued)

(52) U.S. Cl.
CPC ............ *B62B 3/1416* (2013.01); *B62B 3/005* (2013.01); *B62B 3/006* (2013.01); *B62B 3/144* (2013.01);
(Continued)

(58) Field of Classification Search
CPC ....... B62B 3/1416; B62B 3/005; B62B 3/006; B62B 3/1424; B62B 3/144; B62B 3/16; B62B 3/18; B62B 5/0096
(Continued)

(56) References Cited

U.S. PATENT DOCUMENTS 4,071,740 A    1/1978   Gogulski
5,250,789 A    10/1993   Johnsen
(Continued)

FOREIGN PATENT DOCUMENTS

EP         1583050 A1    10/2005
JP        2004-110805 A    4/2004
(Continued)

OTHER PUBLICATIONS

International Search Report (in English and German) issued in PCT/DE2019/000045, dated Jul. 26, 2019; IDS/EP.
(Continued)

*Primary Examiner* — John D Walters
*Assistant Examiner* — Hilary L Johns
(74) *Attorney, Agent, or Firm* — Harness, Dickey & Pierce, P.L.C.

(57) ABSTRACT

The invention relates to a transport equipment with at least one transport device (1a) which is individualised by an identification mean, which has at least one goods depositing device and at least one handle and which can be stacked with respectively identical transport devices, wherein the transport equipment has at least two power-supplied electronic devices arranged on an identical and/or on different transport devices, of which at least one performs the function of a user interface and at least one performs the function of a detection device, and which each have integrated data-processing means and means for wireless data transmission.
The invention is characterised in that each power-supplied electronic device can be individualised by at least one
(Continued)

Figure 1:
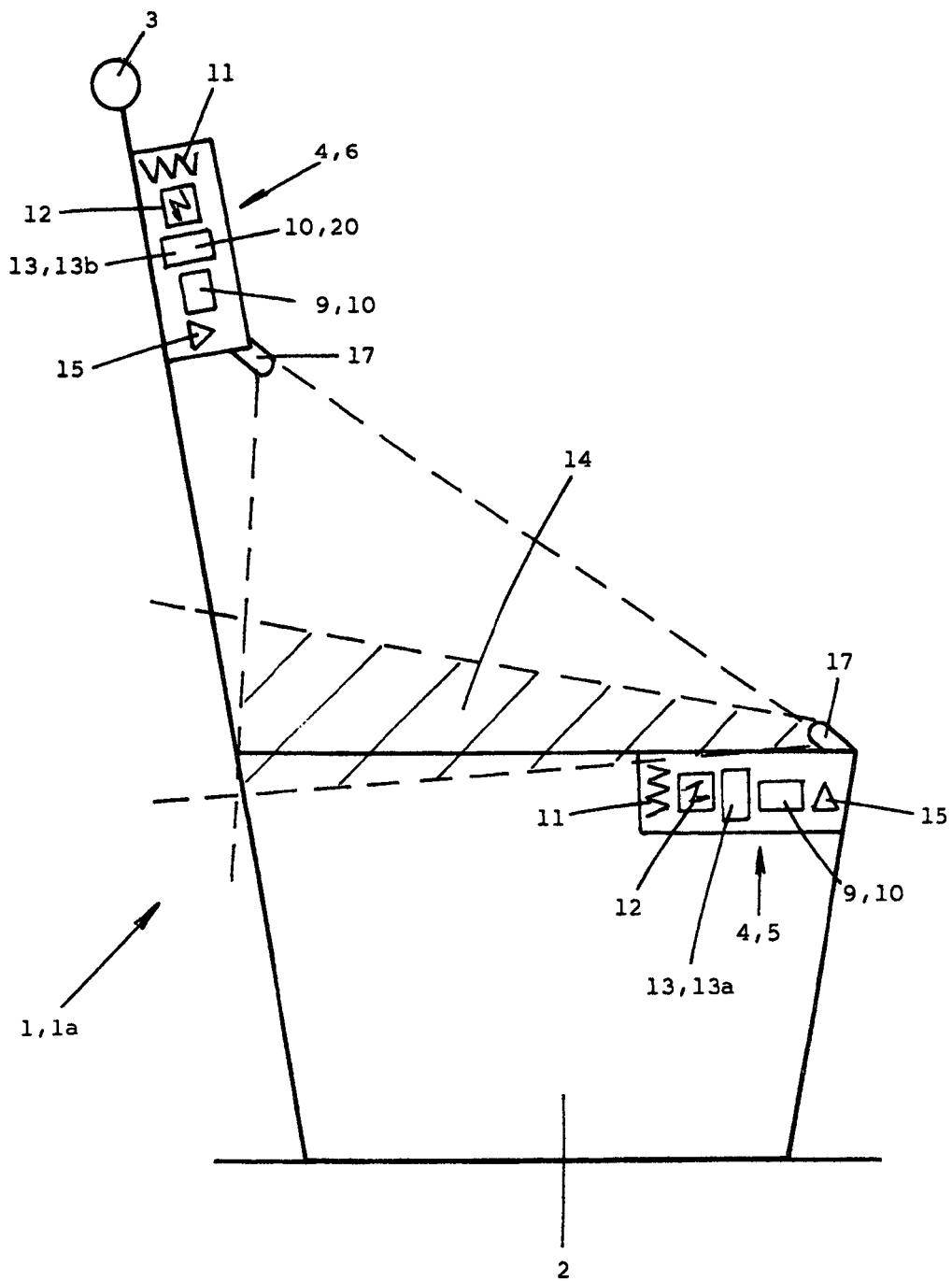

identification means using a machine-detectable identifier, in that the power-supplied electronic devices are arranged on the transport equipment in such a way that the spatial position of at least one further electronic device on the transport equipment can be determined by the at least one detection device, and in that the transport equipment is configured to determine the respective identifier and the respective spatial position on the transport device using the data-processing means and the means for wireless data transmission for at least two of the power-supplied electronic devices such that they can be assigned to one another. The invention also concerns a method for manufacturing, operating and maintaining the transport equipment.

24 Claims, 5 Drawing Sheets

(30) Foreign Application Priority Data

| Mar. 29, 2018 | (DE) | 10 2018 002 625.7 |
| May 5, 2018 | (DE) | 10 2018 003 664.3 |
| May 29, 2018 | (DE) | 10 2018 004 282.1 |

(51) Int. Cl.
  *B62B 3/16* (2006.01)
  *B62B 3/18* (2006.01)
  *B62B 5/00* (2006.01)

(52) U.S. Cl.
  CPC .............. *B62B 3/1424* (2013.01); *B62B 3/16* (2013.01); *B62B 3/18* (2013.01); *B62B 5/0096* (2013.01)

(58) Field of Classification Search
  USPC .................................................... 280/33.993
  See application file for complete search history.

(56) References Cited

U.S. PATENT DOCUMENTS

| 5,287,266 | A | 2/1994 | Malec et al. |
| 5,361,871 | A | 11/1994 | Gupta et al. |
| 5,773,954 | A | 6/1998 | VanHorn |
| 5,821,513 | A | 10/1998 | O'Hagan et al. |
| 6,484,939 | B1 | 11/2002 | Blaeuer |
| 6,910,697 | B2 | 6/2005 | Varatharajah et al. |
| 8,751,318 | B2 | 6/2014 | Kim et al. |
| 2006/0289637 | A1 | 12/2006 | Brice et al. |
| 2012/0296751 | A1* | 11/2012 | Napper ................ G06Q 20/208 705/23 |
| 2015/0271483 | A1* | 9/2015 | Sun ...................... H04N 13/246 348/187 |
| 2018/0025412 | A1 | 1/2018 | Chaubard et al. |
| 2018/0043916 | A1* | 2/2018 | Strothmann .......... B62B 5/0033 |
| 2018/0218351 | A1 | 8/2018 | Chaubard et al. |

FOREIGN PATENT DOCUMENTS

| WO | WO-2000073971 A1 | 12/2000 | |
| WO | WO-2011088568 A1 | 7/2011 | |
| WO | WO-2016/019936 A2 | 2/2016 | |
| WO | WO-2016135142 A1 * | 9/2016 | ......... G06K 9/00771 |

OTHER PUBLICATIONS

International Preliminary Report on Patentability (in English and German) issued in PCT/DE2019/000045, dated Sep. 8, 2020; IPEA/EP.

* cited by examiner

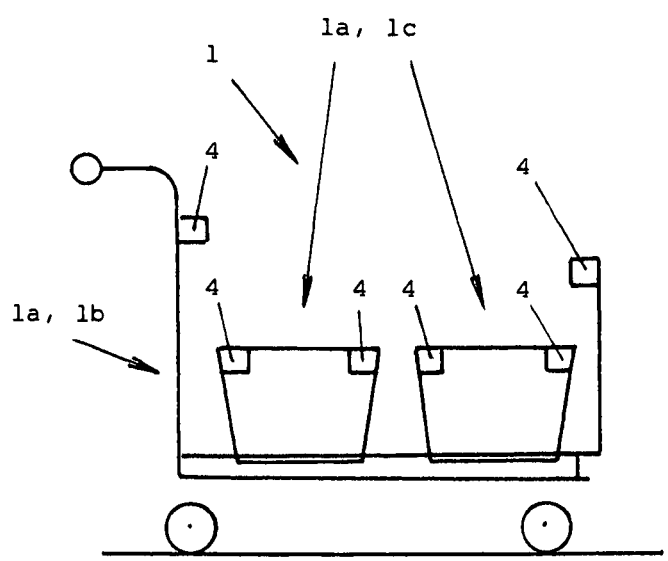

TRANSPORT MEANS WITH AT LEAST ONE TRANSPORT DEVICE AND METHOD FOR PRODUCING, OPERATING, AND SERVICING THE TRANSPORT MEANS

CROSS REFERENCE TO RELATED APPLICATIONS

This application is a U.S. National Phase Application under 35 U.S.C. 371 of International Application No. PCT/DE2019/000045 filed on Feb. 22, 2019, which claims the benefit of priority from German Patent Application Nos. 20 2018 001 120.7, filed Mar. 2, 2018, 20 2018 001 297.1, filed on Mar. 10, 2018, 10 2018 002 625.7, filed on Mar. 29, 2018, 10 2018 003 664.3, filed on May 5, 2018 and 10 2018 004 282.1, filed on May 29, 2018. The entire disclosures of all of the above applications are incorporated herein by reference.

DESCRIPTION

The invention relates to a transport equipment with at least one transport device which is individualised by an identification means, which has at least one goods depositing device and at least one handle and which can be stacked with respectively identical transport devices, wherein the transport equipment has at least two power-supplied electronic devices arranged on an identical and/or on different transport devices, of which at least one performs the function of a user interface and at least one performs the function of a detection device, and which each have integrated data-processing means and means for wireless data transmission. The invention also concerns a method for manufacturing, operating and maintaining the transport equipment.

Transport equipments with at least one transport device are known firstly as transport equipment consisting of only one transport device or identical with this one transport device and secondly as transport equipment with several transport devices.

Transport equipment consisting of only one transport device, which has no electronic equipment and does not require a power supply, can be divided into three categories:

Transport equipment in the first category stacks vertically and has neither a chassis nor castors. The first category includes in particular baskets used in self-service shops and trays used in catering establishments. Transport equipment in the second category stacks vertically and has wheels but no chassis. The second category includes in particular roller baskets used in self-service shops. Transport equipment in the third category stacks horizontally and has castors and a chassis. Examples of the third category include shopping trolleys, platform trolleys, baggage trolleys, roll containers, and stackable forms of tray trolleys and hand trucks. Transport equipment that moves on rollers is usually not motorised. An optional motorisation can make manual movement easier or enable autonomous mobility of the transport device.

Transport equipment with several transport devices can be divided into stacks of the same transport devices, as well as into combinations of different transport devices intended for use as such. Such a combination is formed, for example, by shopping baskets and a platform trolley carrying these shopping baskets, or by portable goods containers and a roll container carrying the goods containers.

The at least one transport device has at least one handle. Handles are in particular push handles and carrying handles, as well as related devices which serve to move and position the transport equipment manually and/or mechanically.

Transport equipment of the third category is known to be fitted with powered electronic devices with the function of a user interface and/or a detection device. In the case of several powered electronic devices, these are connected by cables. These serve not only for the power supply, but also for mutual recognition of the electronic devices, data exchange and integration of the electronic devices into a data processing system. The mobile transport devices are tied to a charging station during the repeatedly required recharging of their power storage unit and cannot be used during this time.

WO 2000 073971 A1 describes a transport device and a system consisting of several electronic devices which can be attached to and removed from the transport device. It is provided that a data processing and data storage device, a barcode reader, a photoelectric barrier and a weighing instrument are only supplied with power if these devices are mounted on the transport device. Electrical plug connections between the devices and the transport equipment provided for this purpose should also serve as a communication port for the respective device. Thus, the plug connections are intended to serve as power supply, for data exchange and for mechanical attachment to the transport device. The communication between the transport device and a cash register should be carried out by means of a cable port or wirelessly.

Transport equipment with powered electronic devices and their use are further described in documents U.S. Pat. Nos. 4,071,740 A, 5,287,266 A, 5,361,871 A, JP 2004 110805 A, 6,484,939 B1, 5,773,954 A, 5,821,513 A, 5,250,789 A, 6,910,697 B2, US 2006/0289637 A1, U.S. Pat. No. 8,751, 318 B2, WO 2016/135142 A1, US 2018/0025412 A1, US 2018/0218351 A1 and EP 1583050 A1. The detection of identification means on transport devices is described in WO 2016/019936 A2. Also known is the product called "AIC" or "Artificial Intelligence Cart" by Tracxpoint. Cables and plug connections in particular make transport devices with power-supplied electronic equipment expensive to manufacture, difficult to maintain, prone to errors, and limit their fields of application and practical suitability.

It is the objective of the invention to further develop a transport equipment of the type mentioned above in such a way that the greatest possible variety of types of transport equipment is made possible and the transport devices can be freely combined to form transport equipment with several transport devices. Production, maintenance and operation are to be simplified in a cost-reducing manner. The solution of the task is described in the characterising part of claim 1.

The invention advantageously achieves that the transport equipment with at least one transport device autonomously and automatically determines an identifier and the spatial position on the transport device with respect to each power-supplied electronic device and assignable to each other. This enables a system integration of the power-supplied electronic devices, for which advantageously neither cable connections nor activities for establishing wireless data connections are necessary. The exclusively mechanical assembly work known from non-powered transport devices for production and maintenance as well as the manual or mechanical combination of transport devices to transport equipment with several transport devices can be advantageously retained unchanged.

Advantageously, a number of options are available for technical implementation.

Every powered electronic device has means for wireless power supply. Integrated power storage units combined with an integrated device for charging or replacing the respective power storage unit are suitable for this purpose. This is advantageous for the safety of the transport equipment and prevents the flow of current between the electronic devices on the transport equipment.

Devices for replacing the storage device may include devices for holding replaceable batteries. However, if the batteries are to be replaced as part of the normal maintenance cycle of the transport equipment, a minimum of six months battery life is required, limiting their use to low power consuming equipment. The preferred embodiment of the invention therefore uses an inductive charging device as a device for charging the integrated power storage unit and advantageously avoids cable connections as well as the replacement of batteries.

According to an advantageous embodiment, the transport equipment is configured to use mutually associated identifiers and spatial position data of the at least two powered electronic devices to initiate, control, or terminate inductive charging processes serving to power the at least two electronic devices. For this purpose, the transport equipment can transmit the aforementioned data to an energy-donating device for evaluation and/or send control signals generated in dependence on these data and/or control the electronic equipment of the transport equipment itself. The charging process can thus be optimised with regard to the spatial position of the energy-receiving devices relative to the inductive energy source and with regard to their individual energy requirements. Furthermore, data can be obtained regarding energy efficiency and the required charging time and frequency, which can vary greatly for different transport equipment and applications. The preferred use of the wireless inductive charging device is not only to charge the energy storage of the respective device, but also as a transmitter or, within the same power-supplied electronic device, serves for supplying power to a transmitter which is intended for inductive power transmission to at least one further power-supplied electronic device. This offers the possibility to transfer energy between the devices of a transport device, preferably from a device with a large power storage to a device with low power consumption, as well as between transport devices. Furthermore, energy can also be transferred between transport devices arranged in a stack. Wireless inductive charging devices can be realised with RF-Power Receiver ICs, for example, as known from the products DA2210 or DA2223 WattUp of the manufacturer Energous, based in San Jose, USA, see energous.com In this context, reference is also made to the intellectual property rights of Witricity, based in 02472 Watertown, USA. With the help of such a charging system, all electronic equipment of a transport equipment with at least one transport device can be charged. Preferably, this is done in a stack of identical transport devices.

Every power-supplied electronic device is equipped with integrated means for wireless data transmission. Known devices that send and/or receive data wirelessly are suitable as such. In addition to electromagnetic waves, ultrasonic waves can also be used as a medium. For this purpose, advantageously priced, standardised components and software are available. The integration of means for wireless power supply and means for wireless data transmission makes it possible to mount the equipment on the transport device only mechanically, since the electronic functions including electronic control equipment are already available autonomously and activated. As a result of only mechanical mounting, an active operating state of the transport device is thus made possible in which at least one power-supplied electronic device individually recognises further power-supplied electronic devices by means of their identification means. When manufacturing the transport device, the powered electronic devices can be supplied with power either before installation or only after installation.

The identification means of each electronic device, which is machine-readable at least in the active operating state and using the means for wireless data transmission, individualises each electronic device by an identifier so that it can be distinguished from and addressed by other, identical or different devices.

In accordance with an advantageous design, an electronic device to be mounted already has an individualising identifier, preferably stored on ROM. However, it can also be generated or individualised after installation.

Every powered electronic device has means for data processing. Depending on the application, the smallest SoC or system-on-a-chip components may be used, especially in the case of environmental sensing devices, as well as tablet computers mounted on the transport device, especially in the case of user interfaces. Means for data processing are in particular control devices, preferably as an embedded system closely integrated into the technical system, and more comprehensive data processing devices which do not or not only fulfil the function of a control. Data processing equipment is particularly suitable for maintaining the system integration of the powered electronic equipment and supporting the intended applications.

According to an advantageous design, the at least one data processing device is integrated into one of the electronic devices supplied with power, whereby it is particularly suitable for those which have the function of a user interface and require a data processing device for this function alone. The at least one electronic control device of this device can then be identical to the data processing device. However, it can also be arranged separately as a further powered electronic device on the transport device. The data processing device stores the identifiers of wirelessly read identification means and the data of the detected spatial arrangement of the powered electronic devices so that they can be assigned to each other. This in turn supports a number of applications. Computer programs required for this can be pre-installed in series, so that electronic devices to be installed, equipped with data processing equipment, also have this necessary component. This allows advantageously a transport equipment with at least one transport device, which, as soon as it is manufactured, assembled, or built up, or in the course of maintenance, is restored and supplied with power, including its power-supplied electronic equipment, is self-sufficient and automatically ready for operation.

The wireless readout of identification means of electronic devices supplied with power in combination with the determination of their spatial arrangement on the transport equipment with at least one transport device enables a doubtless and automatic detection of the coherence of the electronic devices arranged on the transport device advantageously without power or data cables arranged between the electronic devices. Neither the reading out of the identification means nor the determination of the spatial arrangement alone are suitable for achieving this. The electronic devices cannot be addressed without identification means or without individualising identifiers. They can be addressed by means of identification means, but still cannot be identified as belonging to the transport equipment and distinguished from electronic equipment that does not belong to it. Only through the inventive combination of identification means and determined spatial position, identification and addressability succeed. This enables automatic system integration, so that, as with purely mechanical transport devices, mechanical assembly is sufficient for production and maintenance. Similarly, manual combination or assembly of a transport equipment is limited to a mechanical activity.

How the spatial arrangement is best determined depends on the type and arrangement of the electronic equipment. Suitable embodiments are listed in the description of FIG. 1.

These examples show that the function of spatial positioning, which is essential for the invention, can be achieved with the help of already existing means and therefore advantageously with marginal additional costs.

Contrary to an assignment only determined by programming, only the determination of an actual spatial arrangement opens up the possibilities of self-monitoring and self-checking of the transport device, which are important in the context of the invention.

According to an advantageous embodiment the transport equipment is configured to generate data concerning the state or changes of state of the transport equipment or parts of the transport equipment, in particular the presence and/or the configuration and/or the arrangement and/or the function and/or the damage or non-damage and/or the intended or not intended use. The transport equipment is further configured to make data concerning the past and/or present state or state changes of the transport device available to a user using the at least one user interface and/or to transmit it wirelessly to data processing devices not belonging to the transport equipment. As a result of the assignment of identifiers and position data and with continuous power supply to the electronic devices, an operating state of the transport equipments intended for their use is established, during which the transport equipment records the manufacture and/or maintenance and/or use and/or damage of the transport equipment and data relating thereto by means of the at least two power-supplied electronic devices and using at least one detection device, in particular image data, measurement data and data derived therefrom, are stored using at least one data processing device and/or made recognisable by optical and/or acoustic signals using at least one user interface and/or relevant data are transmitted with the aid of a wireless data connection.

A sufficiently accurate determination of the positions of the electronic devices supports in particular the detection of deformation, breakage, loss of parts, and similar damage, as well as the detection of vibration behaviour, which may indicate damaged rollers or unsuitable ground or hazardous situations. In combination with a self-perception of the transport device in the form of camera images and/or other data obtained from sensors, important information can be obtained automatically for the safety, use and maintenance of the transport equipment and its transport devices and a user can be notified of this via a user interface. As is well known, ensuring the safe and proper use of transport equipment, especially in markets, is a major challenge for market operators, since transport equipment is used by numerous customers in the markets in a way that can hardly be controlled. Over-coming this challenge becomes all the more important the more valuable transport equipments become and the more application processes are to support them without errors.

A further, significant advantage of a spatial position determination which is as accurate as possible is the use of the data of at least one first detection device to correct disturbing influences or signals which affect at least one second detection device. According to an advantageous embodiment the transport equipment is configured, firstly, to continuously generate spatial position data relating to the position of at least one electronic device with the aid of at least one first detection device, position changes being detected as a disturbance signal of a disturbance influence acting on the transport equipment, secondly, to use the generated position data to determine the effect of the disturbance on at least one second detection device and, thirdly, to calibrate and/or continuously denoise the data generated by the at least one second detection device taking into account the disturbance signal. The above three steps of a process supported by this configuration are preferably performed continuously and in parallel while the transport equipment is in use. For example, data of optically registered vibrations or accelerations are suitable for denoising data of a weighing instrument, because its force sensors are exposed to the same vibrations or accelerations and thus the contribution of these disturbing influences is separated from the measurement result and the weighing of goods is possible with precision even on moving transport equipment. For this purpose, the attachment of a camera to the transport device can be flexible or spring-mounted, so that interference signals are amplified and the denoising of a scale is improved.

The inventive transport equipment with at least one transport device is advantageous for important application processes. For example, it is particularly suitable for a method for determining the position in the area of operation, as known from US 2018/0025412 A1, since the detection of spatial positions of the electronic devices can be extended to the detection of the area of operation by using already existing means. The invention further facilitates the use of first electronic devices on at least one transport device for the machine learning of second electronic devices. For example, the scanning of barcodes by the user can be used to train optical goods recognition. In this case, the barcode uniquely identifies the goods and this unique information is used to confirm correct optical recognition and correct incorrect optical recognition. Machine learning algorithms can use this information to improve optical product recognition.

It is common practice in self-service markets to offer customers a choice of different transport devices. At least one type of shopping trolley and additionally a roller basket or a hand basket is the minimum equipment of a discount store. Larger markets, shopping malls, or airports often integrate a catering offer in which trays are used. Specialist stores also use different platform trolleys. Transport devices are often combined to transport equipment with several transport devices, for example shopping trolleys carrying shopping baskets.

The invention is new and advantageous in that it is highly independent of the design of the transport device and of the configuration of a transport equipment with at least one transport device and is applicable to all three categories of transport devices. This enables a category and type overlapping standardisation, part uniformity, and integrating different transport devices into unified application processes.

According to a first advantageous design, the at least two electronic devices of a transport device in the stacking compound of several identical transport devices occupy two different stacking dead spaces. The at least two electronic devices are preferably arranged on the handle and/or on the goods depositing device and/or on an optionally available chassis and/or on an optionally available child seat device, as shown for example in WO 2012/034556 A2, FIG. 6 and FIG. 7.

According to another advantageous embodiment at least one electronic device is positively connected to the handle or to a goods depositing device or to the optionally available chassis of the at least one transport device or to the optionally available child seat device in such a way that the positive connection forces the intended position of the electronic device to further electronic devices arranged on the at least one transport device. A rectangular or almost rectangular and horizontal or slightly inclined surface may be considered to be a common feature of the goods depositing device, whether it is part of a tray, basket or trolley. In particular, the inclined surface may be a platform, a basket base or even a frame for receiving a basket. This enables electronic devices, for example, formed by standard parts, which are positioned at the corners or centrally between two corners. Electronic devices placed at the corners can simultaneously take over the function of corner protection parts, centrally placed devices can take over the function of a bumper, or be shaped as such on the outside and thus replace conventional corner protection parts and bumpers.

Analogue standardisation in the handle area is supported by the same ergonomic requirements. In particular, four common types of handles can be distinguished: the handle of a shopping basket held with one hand, the handle of a roller basket arranged at the end of an extendable rod, the handle of a shopping cart, platform trolley or luggage trolley with a handle bar for two hands and a pair of separate handles for one hand each on a roll container. In addition to the actual grip points concealed by the hand, the aforementioned handles have further sections or parts suitable for the arrangement of electronic devices. For example, sections on the handle bar on both sides of the handle location, the extendable bar of a roller basket handle, the central section or the left and right outermost section of a handle with handle bar, as well as mounting sections on the handles of a pair of handles are suitable. Other handle shapes and arrangements of the electronic devices on the handles are conceivable.

In the case of all variants, it is advantageous if the electronic device has a housing which at the same time fulfils a mechanical function appropriate to the respective position, for example, as already described, as a corner protection part or bumper or also as a reinforcing part, fastening part, and the like. Furthermore, it is advantageous if the assembly is possible by simple means, for example by using a rubber mallet. For this purpose, the housings of the electronic devices have striking surfaces and snap-in connections for locking at the mounting points.

The proposed standardisation of electronic devices, both their components and their external form, is not only beneficial for mass production and maintenance, but also, and in particular, for integration into application processes. For example, a recognition system based on deep learning for the detection of goods will be much easier to implement if the cameras or sensors used are always the same. Since in this application case the fault tolerance is extremely low, the proposed standardisation is indispensable. Even in the case of inductive power supply, the standardisation of the parts is a decisive advantage. These can thus be charged in the same way and the power consumption during use can be better estimated. If transport equipment in industry or in the logistics environment of a warehouse as well as in the case of use by end customers have the same electronic equipment, several stages of a supply chain can be advantageously supported by uniform and comprehensive processes.

Electronic devices of the described type can be realised with identical parts for different mounting points, apart from the shape of the housing. According to this particularly advantageous design, at least two electronic devices differ only by their housing and their identification. This means that they can be integrated into other storage or shop equipment, for example shelves or displays, again with only a modified housing shape, and the functions that can be realised with the transport devices alone can be expanded and supplemented. The ability to create such an extended system is an essential advantage of the inventive transport equipment. Uniform hardware thus supports uniform software and enables a consistent and conclusive application concept for the user.

The invention is explained below by means of embodiments.

It shows

Figure 2:
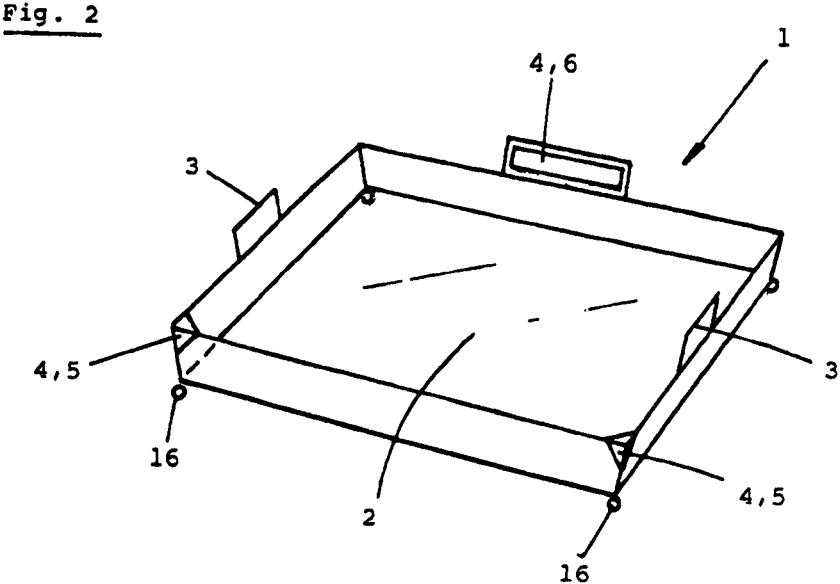
Figure 3:
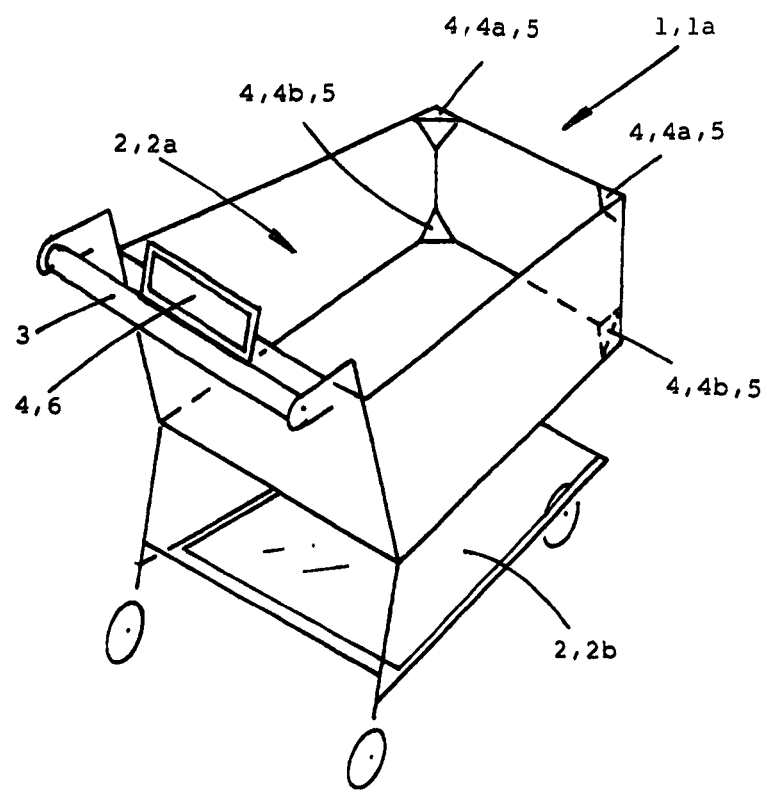
Figure 4:
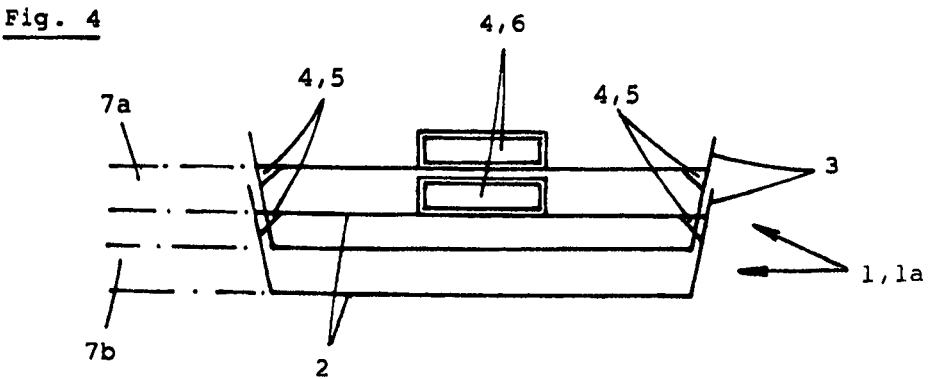
Figure 5:
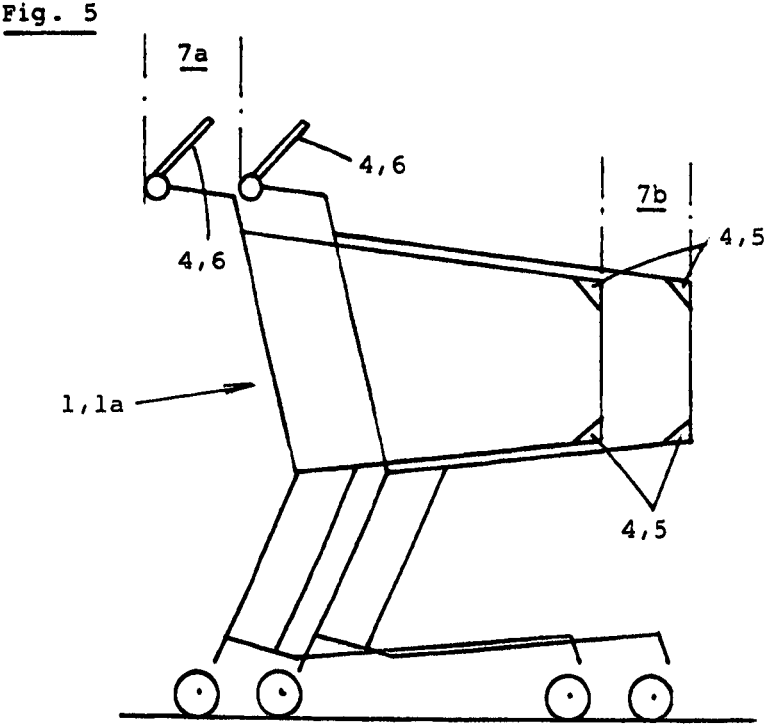
Figure 6:
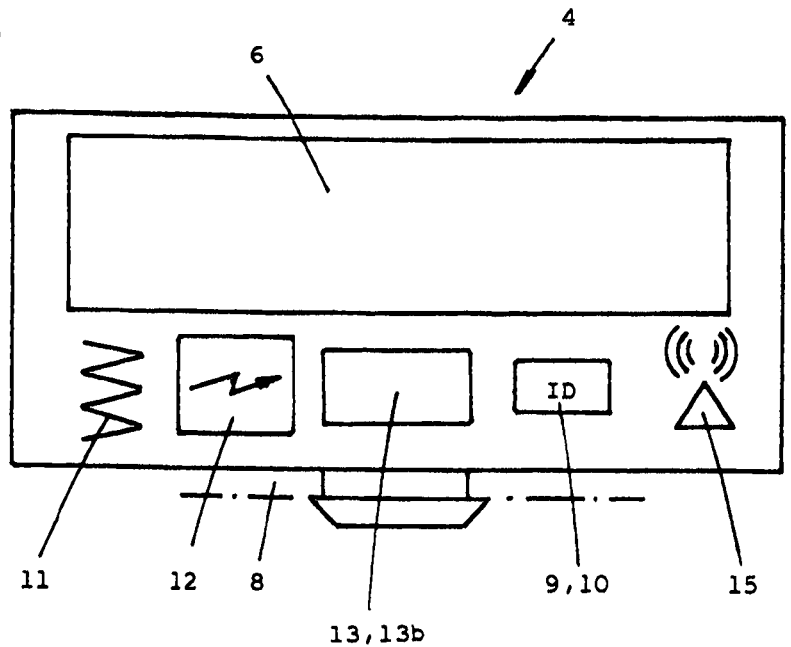
Figure 7:
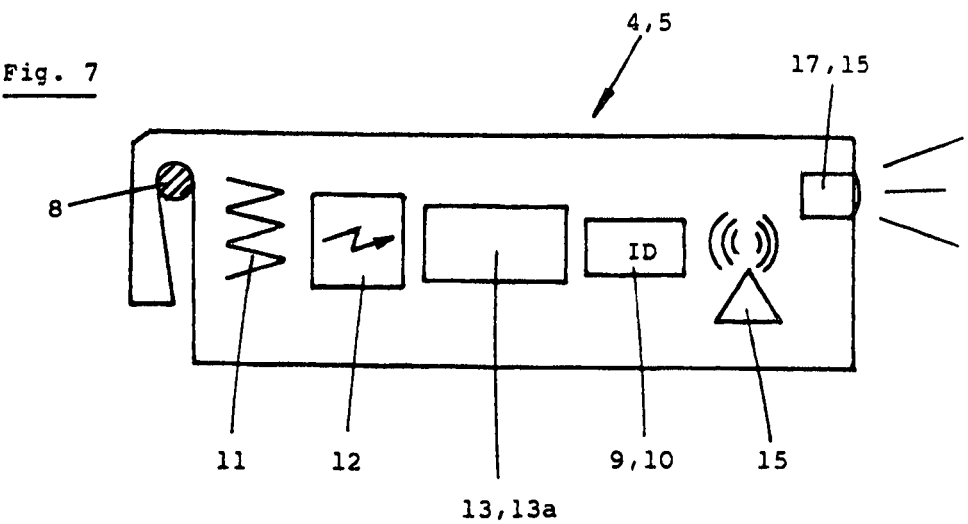

FIG. 1 a transport equipment with one transport device with two powered electronic devices;

FIG. 2 a transport device of the first or second category;

FIG. 3 a transport device of the third category;

FIG. 4 two transport devices of the first or second category;

FIG. 5 two transport devices of the third category;

FIG. 6 an electronic device serving as a user interface at a mounting point;

FIG. 7 an electronic device serving as a detection device at a mounting point;

FIG. 8 a transport equipment with several transport devices.

FIG. 1 shows a transport equipment 1 with at least one transport device 1a which is individualised by an identification means 9, which has at least one goods depositing device 2 and at least one handle 3 and which can be stacked with respectively identical transport devices 1a, wherein the transport equipment 1 has at least two power-supplied electronic devices 4 arranged on an identical and/or on different transport devices 1a, of which at least one performs the function of a user interface 6 and at least one performs the function of a detection device 5, and which each have integrated data-processing means 13 and means 15 for wireless data transmission.

Each power-supplied electronic device 4 can be individualised by at least one identification means 9 using a machine-detectable identifier 10. The power-supplied electronic devices 4 are arranged on the transport equipment 1 in such a way that the spatial position of at least one further electronic device 4 on the transport equipment 1 can be determined by the at least one detection device 5. As an example, detection device 5 is in the field of view of camera 17 of the user interface. The transport equipment 1 is configured to determine the respective identifier 10 and the respective spatial position on the transport equipment 1 using the data-processing means 13 and the means for wireless data transmission 15 for at least two of the power-supplied electronic devices 4 such that they can be assigned to one another.

The inventive solution is initially explained in more detail separately from the exemplary representation of a roller basket selected in FIG. 1:

The mutual detection of identifiers 10 of electronic devices 4, for example with the aid of trans-ponders, as known from the state of the art, does not achieve the objective, since no spatial positions at the transport equipment 1 can be determined and assigned to an identifier 10 in each case. The system knows which devices 4 exist, but not where they are. The reciprocal recording of spatial positions, for example, using cameras that record each other, which is also known from the state of the art, does not record identifiers 10, so that an assignment of identifiers 10 and spatial positions is also not possible. The system knows at which positions devices 4 are arranged, but not which ones. A simple combination of the two known approaches still does not lead to an inventive solution, because although identifiers 10 and spatial positions are detected, they cannot be assigned to each other. The system knows which devices 4 exist and where devices 4 are located, but not which device 4 is located where. First of all, without specifying the means used, configurations can be described by which the assignment is achieved. Here it is essential that the detection of the position is achieved at a certain transport equipment 1, which can be distinguished from similar transport equipments 1 and is thus individualised.

According to an exemplary first configuration, at least a first electronic device 4 is configured to detect its position on a not yet individualised transport equipment 1. The transport equipment 1 has at least one second electronic device 4 whose position on similar transport equipments 1 is always the same. The at least one first electronic device 4 and the at least one second electronic device 4 are further configured to register an identical signal or, equivalently thereto, mutually assignable different signals which are suitable for individualising the transport equipment 1. On the basis of the signal detected by the first and second devices 4 and with the aid of data exchange between the devices 4, the devices 4 determine that they are located on the same, thus individualised, transport equipment. Either the devices 4 already have identifiers 10, which can thus be assigned to the respective spatial position, or identifiers 10 are generated as a result of the determination of the arrangement on a specific transport equipment 1. By exchanging identifiers 10 and spatial position data 20, the integration of the electronic devices 4 of the transport equipment 1 is achieved and continues even if the signal is no longer present. Since the at least one first electronic device 4 is configured to detect its position itself, it assigns its position data 20 to its identifier 10. On the basis of the detected signal, the at least one first electronic device 4 registers the presence of the at least one second electronic device 4, whereby, on the basis of their always same position on similar transport equipments 1, their position can be determined by the at least one first electronic device 4. As an example, the at least one first electronic device 4 is present as a detection device 5 with a camera and the at least one second electronic device 4 is present as a detection device 5 with a force sensor. Signals which can be assigned to one another are supplied by goods deposited on the goods depositing device 2, wherein these are optically detected by at least one camera 17 and wherein the at least one force sensor registers their weight. Optionally, especially in the case of heavy goods, the camera 17 can also register a deformation of the transport device 1 or a change in position of parts of the transport equipment 1 which can be assigned to a measured weight. In cases other than those described, the signal may be given, for example, by an identification means 9 which is assigned to the transport equipment 1 but not to a specific electronic device 4, for example an individual number plate.

According to an exemplary second configuration, a first electronic device 4 is capable of detecting the associated identifier 10 and position of a second electronic device 4 and transmitting the associated identifiers 10 and position data 20 to the second electronic device 4. The second electronic device 4 thereby determines the position of the first electronic device 4 relative to its own position 4 and generates an identifier 10 and position data 20 of the first electronic device 4 in association with each other; when these data are transmitted to the first electronic device 4, the latter can store the data and thus individualise itself, even if it did not initially have an identifier or position data. As an example, the first electronic device 4 is a detection device 5 with a camera 17 and the second electronic device 4 is a user interface 6, the housing of which has an externally visible identification means 9, which the camera 17 uses to detect the identifier 10 assigned to the user interface 6 simultaneously with its position.

Numerous variants of the two exemplary configurations and solutions combining several variants can be found. The type of construction, the equipment with electronic devices, and the use of the transport equipment 1 essentially determine which solution is optimal.

The machine-recognisable identifiers 10 used by the identification means 9 are in particular identifiers 10 which can be read from a storage medium or recorded by a camera 17 or scanner, so that identification means 9 can exist in particular as an electronic storage medium or as a carrier of a visible code, for example a QR Code. The identifiers 10 can be permanently present or generated as required. The at least one detection means 5 can optionally also determine its own position on the transport equipment 1 on the basis of the perception of at least part of the transport equipment 1.

The configuration of the transport equipment 1, to determine identifiers 10 and spatial positions assignable to each other, comprises in particular the selection of suitable and matching means and devices, both their spatial arrangement and their information-technological design. Thus, according to an exemplary design, the camera 17 of a detection device 5 must be directed at an identification means 9 and must be suitable for reading a QR code carried by the identification means, and suitable data processing means 13 must be available for assigning identifiers 10 and spatial position data 20 to each other. Suitable data processing means 13 require suitable hardware as well as the processing and assignment of identifiers 10 and software providing position data 20. The suitable configuration is therefore not achieved by mechanical, detection or information technology means alone, but only by their integration as described in this document.

FIG. 1 shows a transport equipment 1 with only one transport device 1a or a transport equipment 1 which is identical with the one transport device 1a. The transport equipment 1 can also be formed by a combination of several transport devices 1a, e.g. by a transport trolley carrying one or several shopping baskets. If the transport equipment 1 is formed by several transport devices 1a, the transport devices 1a take up a defined position in relation to one another, which makes it possible to determine the spatial position of the electronic devices 4 not only on the respective transport device 1a, but also on the transport equipment 1 as a whole. Due to the defined spatial position of several transport devices 1a within a transport equipment 1, the solutions for a transport equipment 1 with only one transport device 1a and for a transport equipment 1 with more than one transport device 1a are equivalent.

Each identification means 9 uses a machine-recognisable identifier 10, which enables the individualisation of the powered electronic devices 4. Data processing means 13 are present as control device 13a and/or as data processing device 13b. Each powered electronic device 4 is equipped with an integrated power storage device 12, with an integrated device 11 for charging or replacing the respective power storage device 12 and with integrated means 15 for wireless data transmission. Due to the active operating state in which the electronic devices 4 are powered, firstly, further electronic devices 4 are individually recognised by at least one powered electronic device 4 by their identification means 9, secondly, the spatial arrangement of at least one further powered electronic device 4 using at least one detection device 5 and at least one data processing device 13b is determined on the transport equipment 1 and on the respective transport device 1a and spatial position data 20 relating to this arrangement is generated, and thirdly, for each power-supplied electronic device 4, identifiers 10 and position data 20 can be assigned to one another using at least one data processing device 13b.

This is achieved by a method for the manufacturing, operating and maintaining of a transport equipment 1 shown in FIG. 1, according to which the transport equipment 1 autonomously and automatically determines an identifier 10 and the spatial position on the transport equipment 1 for each power-supplied electronic device 4 in a manner that allows them to be assigned to each other. Optionally, this is done automatically solely by the power supply of the electronic devices 4 or a start signal, e.g. the actuation of a switch on the transport equipment 1 or a wirelessly transmitted control signal may be required in addition. The said method is an essential part of the invention.

In a first step, at least one further electronic device 4 is individually detected by at least one power-supplied electronic device 4 by means of its identification means 9. For this purpose, the electronic devices 4 can actively transmit identifiers 10 or passively available identifiers 10 can be actively collected, for example by using active and/or passive RFID tags. The identifiers 10 may already exist or may be generated for this purpose. With which technical means and by which direct or indirect means the identifiers 10 are transmitted is irrelevant for the invention. What is decisive is that as a result of the read-out or transmission process the identifiers 10 are available to at least one data processing device 13b.

In a second step, the at least one detection device 5 determines the spatial position of at least one further electronic device 4 on the transport equipment 1 and/or at least two detection devices 5 determine their positions by means of the detection of a common spatial area 14. The detection of a spatial area 14 is equivalent to the detection of objects in the spatial area 14. At least one data processing device 13b is used to generate spatial position data 20.

The first and second steps can optionally also be performed in reverse order or simultaneously or as only one step. If, for example, a sticker with a QR code is detected as an object in the spatial area 14, which as identification means 9 individualises an electronic device 4, the spatial arrangement and identifier 10 are determined in only one step. Preferably, the first and second steps are parallel processes or a single process.

In a third step, the transport equipment 1 determines the respective identifier 10 and the respective spatial position on the transport equipment 1 using the data-processing means 13 and the means 15 for wireless data transmission for at least two current-supplied electronic devices 4 such that they can be assigned to one another.

According to a first advantageous embodiment, from at least one power-supplied electronic device 4, which is a detection device 5, together with image data generated by this detection device 5 or as part of the image data, the own identifier 10 and/or the detected identifier of a further electronic device 4 are transmitted wirelessly to a further electronic device 4. For example, a spatial area 14 is covered by at least two electronic devices 4, which are detection devices, and the image data generated are intended for transmission together with the identifiers 10 of the respective electronic devices 4. The image data and identifiers 10 are transmitted wirelessly, whereby the assignment of identifiers 10 and image data is achieved in each case by joint transmission. Due to the spatial area 14 covered, the image data can be used to calculate, with the aid of a data processing device 13b, spatial position data 20 of the devices 4 producing the image data, which in turn can be assigned to the identifiers 10. For this purpose, for example, a first electronic device 4 having the function of a user interface 6 also has a camera 17 and thus a detection device 5. At least one second electronic device 4 serves as detection device 5 and also has a camera 17. The camera 17 of the first and the camera 17 of the second device 4 have an overlapping field of view, i.e. there is a spatial area 14 which is detected by both cameras 17. By means of a data processing device 13b of the first electronic device 4, 6, which is equipped with a computer program suitable for this purpose, objects or processes located in this spatial area 14 and detected by both cameras 17 are identified as identical, so that the position of the cameras 17 and thus also of the electronic devices 4 can be calculated from the image information supplied by the cameras 17. If identifiers 10 and image data, from which position data 20 are calculated, are then transmitted together, their allocation is unambiguous and achieved in a single process. Since the transport equipment 1 with at least one transport device 1a is intended for the transport of goods, goods of known size and shape detected by several detection devices 5 in the spatial area 14 can be used to determine the position of the detection devices relative to the detected goods with high accuracy. Sections of the transport equipment detected by at least one camera are also suitable for this purpose.

According to a second advantageous embodiment, the spatial arrangement of at least one power-supplied electronic device 4 is determined using an optical and/or acoustic, actively generated or passively available signal, through which an identifier 10 is coded and transmitted. For example, an electronic device 4 may be individualised by an externally visible QR code, or an infrared signal may code a bit sequence and thus transmit an identifier 10. Ultrasonic signals are also suitable both for the transmission of an identifier 10 and for the determination of distance and position. A spatial limitation of transmitting and receiving directions can be advantageous and can be used to determine spatial arrangement. This is true in the case of the exemplary use of an infrared signal, but is less crucial when an externally visible QR Code is detected. In this case, too, a single operation supports the assignment of identifier 10 and spatial position data 20.

A third preferred embodiment of the transport equipment 1 uses a transport device 1a with at least one power-supplied electronic device 4, for which a first and a second spatial position is provided on the transport device 1a, wherein in both positions the electronic device 4 is connected to an identical mounting location 8, wherein between the at least one electronic device 4, which takes up the first spatial position, and the mounting location 8, see FIG. 6 and FIG. 7, there is a current-conducting contact and wherein no current-conducting contact exists between the at least one electronic device 4 occupying the second spatial position and the mounting location 8. This third version is particularly suitable for transport devices 1a made of metal. Instead of cables, the metal parts of the transport device 1a serve as conductors between current-supplied electronic devices 4. Current flow between current-supplied electronic devices 4 is here used by at least one device 4 firstly to individually recognise further devices 4 by means of their identification means 9 and is simultaneously used secondly to determine the spatial arrangement of the devices 4 on the transport device 1a. In the case of this version, the conductive contact serves as a detection device 5 which receives electrical signals. The electrical contact is only established at a certain position of the electronic device 4 at the intended mounting point 8, so that the spatial position of the electronic device 4 on the transport device 1a is determined by its establishment. In accordance with this design, it is also possible that detection means 9 are programmed and equipped with individualising identifiers 10 only when the current flow is used. During the use of the transport equipment 1a, a current flow through metal parts which may be in contact with persons or goods must be avoided. While the first spatial position of the at least one current-supplied electronic device 4 at the installation site 8 temporarily serves to transmit identifiers and position data in a setup process, the second, permanent position serves to establish the state of use. This enables a two-stage assembly process. In a first step, power-supplied electronic devices 4 are pre-assembled in the first position. This is followed by an automatic setup process, which is completed within one or a few seconds. This is followed by a second assembly step in which electronic devices 4 are moved from the first to the second position. This can be done in the simplest way, for example by striking with a rubber mallet.

Depending on the design and use of the means of transport, the three exemplary embodiments can also be combined and further, analogous embodiments can be found.

According to the three exemplary designs, identifiers 10 and position data 20 can be assigned to each other for each power-supplied electronic device 4. In a third step, this assignment is carried out using at least one data processing device 13b of the device 4 bringing the data together. The identifiers 10 and spatial position data 20 of integrated electronic devices 4 can be stored in particular in at least one of the electronic devices 4. The stored identifiers 10 shall be automatically updated in case of exchange of an electronic device 4, but not when signals from other sources, for example from a nearby other transport device 1a not belonging to the transport equipment 1, are registered.

The inventive transport equipment 1 with at least one transport device 1a can be realised with a multitude of different devices 4 and adapted to different requirements.

Devices 4 having the function of a user interface 6 are, for example, optical or acoustic signalling devices, screens or touch screens. Devices 4 having the function of a detection device 5 are for example devices equipped with barcode scanners, cameras 17, infrared sensors, ultrasonic sensors, or force sensors 4. Electrical devices 4 can have the function of both a user interface 6 and a detection device 5. For example, a barcode scanner can emit an audio signal or sensors can be integrated into a facility with a touch screen. In general, user interfaces 6 have at least one function intended for or addressed to a user, while detection devices 5 detect objects or processes in their environment. Only signal-emitting or signal-receiving devices, in particular RFID tags, which serve neither as user interface 6 nor as detection device 5, are not powered electronic devices 4 in the sense of the invention. Transport equipments 1 equipped with user interfaces 6 and recording devices 5 are used in particular in logistics and trade processes, for example the recording of goods and the invoicing of goods by a purchasing customer, or the recording of stock movements in a warehouse.

Identification means 9 are understood to be all means which are suitable for making an object carrying the identification means 9 identifiable and distinguishable from similar objects, in particular in the form of character codes, bar codes, QR codes, as well as data-carrying means such as transponders. Identifiers 10 are to be understood as characteristics enabling this differentiation, for example serial numbers or individual codes, as well as their presence as data.

FIG. 2 shows a transport device 1a with a goods depositing device 2 designed as a flat basket, a pair of handles 3, and three electronic devices 4, two electronic devices 4 being detection devices 5 and one electronic device 4 being a user interface 6. Optionally, rollers 16 are arranged on the bottom of the goods depositing device 2. Instead of a pair of handles 3, as in the case of hand baskets, a centrally located handle 3, pivotally attached to the goods depositing device 2, can be used. Electronic devices 4 can be arranged in a different number and at different positions than shown in FIG. 1 or FIG. 2. Trays, shopping baskets and roller baskets in particular can be derived from the basic principle shown in FIG. 2.

FIG. 3 shows an example of a transport device 1a in the form of a shopping trolley. It has a first goods depositing device 2a in the form of a basket and a second goods depositing device 2b in the form of a platform or floor grid. At the rear there is a handle 3 in the form of a push handle, on which an electronic device 4 is centrally located as a user interface 6. At the front end of the basket there are first electronic devices 4a at the top and second electronic devices 4b at the bottom designed as detection devices 5. The upper electronic devices 4a are suitable for detecting goods on the first goods depositing device 2a, i.e. in the basket, while the lower electronic devices 4b are suitable for detecting goods on the second goods depositing device 2b, i.e. on the platform or floor grid. From the basic principle shown in FIG. 3, shopping trolleys, platform trolleys, luggage trolleys, roll containers and tray trolleys in particular can be derived. However, the subject of the invention is not limited to transport equipment 1 with the mentioned transport device types, but also includes further possible types of stackable transport devices 1a.

Shopping trolley handles 3 are usually composed of several parts. A division into a left corner part, a middle part and a right corner part is particularly advantageous for production, assembly and adaptation to different trolley widths or handle lengths. If detection devices 5 on handle 3 are to be used to determine the position of detection devices 5 on the front upper basket corners, it is advantageous to integrate detection devices 4 in corner sections of handle 3. A user interface 6, on the other hand, should preferably be located centrally on handle 3, so that the user can maintain a position in the pushing direction of the transport device 1a when using the user interface 6. It is therefore advantageous to equip the entire handle 3, consisting of corner and middle sections, with a powered electronic device 4, the components of which are distributed between the corner and middle sections and which are also electrically and electronically integrated by mechanical assembly of the corner and middle sections, preferably by plug-in connection. Optionally, the power-supplied electronic device 4 serving as user interface may be permanently mounted on the transport device 1a or detachably formed by a mobile communication device, for example a smartphone or a tablet, which takes up a defined position on the transport device 1a, e.g. in a holder. The defined position is decisive, regardless of the mechanical means used to secure it.

FIG. 4 shows two of the transport devices 1a in the version shown in FIG. 2 in a stacking arrangement. Stacks formed from transport devices 1a have a typical stacking distance for the respective transport device 1a as well as, depending on the stacking distance and geometry of the transport device 1a and, in the stacking direction, stacking dead spaces 7a, 7b at the front and rear of the transport device 1a that are not used for stacking. The handles 3 and electronic devices 4 in the form of detection devices 5 and user interfaces 6 shown in FIG. 4 are explained in the description for FIG. 3.

FIG. 5 shows two transport devices 1a of the version shown in FIG. 3. These transport devices 1a of the third category stack horizontally. The electronic device 4 designed as user interface 6 at the rear of transport device 1a and the electronic devices 4 designed as detection devices 5 are located in two different stacking dead spaces 7a, 7b.

FIG. 6 shows an electronic device 4 at a mounting location 8. The electronic device 4 serves as a user interface 6. It is individualised by an identification means 9 with a wirelessly readable stored identifier 10. Means for wireless power supply 11, e.g. as an inductive charging device, are provided for charging a power storage device 12, here a battery. The power storage device 12 supplies a data processing device 13b, means 15 for wireless data transmission, e.g. for establishing a Bluetooth or WLAN connection, with power. The electronic device 4 here includes, for example, a touch screen, which serves the function of the electronic device 4 as user interface 6.

FIG. 7 shows an electronic device 4 at a mounting location 8. The electronic device 4 serves as a detection device 5. It is individualised by an identification means 9 with a wireless readable or detectable identifier 10. Means for wireless power supply 11, here as a wireless inductive charging device 11a, e.g. as a receiver coil or as an RF-Power Receiver IC, are intended to charge a power storage device 12, here a battery. The power storage device 12 supplies power to an electronic control unit 13a, and means 15 for wireless data transmission. Among the devices supplied with power here is, for example, a camera 17, which serves the function of the electronic device 4 as detection device 5.

FIG. 6 and FIG. 7 show exemplary designs. Other designs are possible. Common to the electronic devices 4 is that they are self sufficient. They neither need cable connections among each other nor cable connections for charging. For this purpose they are equipped with a wireless inductive charging device 11a according to an advantageous design.

FIG. 8 shows a transport equipment 1 with at least one transport device 1a, which is exemplarily formed by a first transport device 1b in the form of a trolley and two further transport devices 1c in the form of shopping baskets. The first transport device 1b and the two further transport devices 1c are structurally coordinated with one another in such a way that the further transport devices 1c assume a defined position on the first transport device 1b. For this purpose, for example, the goods depositing device 2 which is available as a platform can have recesses into which the other transport devices 1c fit exactly. Due to the precise arrangement, in addition to the spatial position of the powered electronic devices 4 of each transport device 1b, 1c on the respective transport device 1b, 1c, the spatial position of all powered devices 4 on the transport equipment 1 as a whole is also determined. The system integration of all electronic devices 4 of transport equipment 1 can thus be achieved analogously and equivalently to the system integration of the powered electronic devices 4 on only one transport device 1b, 1c. This is where the advantage of the invention is most evident. Transport devices 1b, 1c are kept ready in separate stacks of transport trolleys and shopping baskets at collection points. They are repeatedly removed from these stacks and randomly combined to form transport equipments 1 from the transport trolleys and shopping baskets shown here as examples. This means that for each new combination, the powered electronic devices 4 of the newly formed transport equipment 1 must identify each other as belonging together and integrate as a system. This applies regardless of whether the stacks are also transport equipments 1 or whether only each individual transport device 1a in the stack is a transport equipment. The integration of several transport devices 1a to form a transport equipment 1 is only practical if the system integration is carried out autonomously and reliably in a time span that is imperceptibly short for the user or without waiting time. A waiting time can also be avoided by the fact that the power-supplied electronic devices 4 remaining in a defined position each perform a function for the user and integrate as a system at some point during the use process.

For example, camera data generated by different recording devices 5 can be stored locally and only later be combined in a data processing device 13b. For example, camera data generated by different detection devices 5 can be stored locally and only later be merged in a data processing device 13b. The problem of repeated recombination also applies analogously to the case mentioned in the description to FIG. 3, in which the power-supplied electronic device 4 serving as user interface 6 is temporarily arranged on the transport equipment 1 with at least one transport device 1a or on the at least one transport device 1a. The transport equipment 1 with at least one transport device 1a is formed exactly when the power-supplied electronic devices 4 provided for this transport equipment 1, i.e. at least one user interface 6 and at least one detection device 5, determinably occupy an intended spatial position on the transport equipment 1 and the transport equipment 1 is dissolved exactly when the current-supplied electronic devices 4 no longer occupy this position. Certain configurations can be defined as transport equipment 1, in particular by programming means. For example, a shopping trolley alone, a basket alone, as well as a shopping trolley loaded with one basket or loaded with two baskets can serve as transport equipment 1, so that a shopping customer can freely choose between these options. It is also useful to specify what is not a transport equipment 1 with at least one transport device 1a or what different transport equipments 1 are. For example, firstly a transport trolley with baskets, secondly a stack of the transport trolleys and thirdly a stack of the baskets can be defined as different transport equipments 1 or it can be specified that the stacks are not transport equipments. If one considers a stack as a whole, the spatial position of the powered electronic devices 4 in this stack is different from the configuration of a transport equipment 1 with at least one transport device 1a intended for use. Not only different spatial arrangements but also undesirable configurations can be distinguished from the intended configurations with the aid of the inventive solution. For example, it may be appropriate that unsafe positions, shoplifting-promoting positions, etc. do not support system integration of powered electronic devices. Known pairing technologies, such as NFC or Bluetooth, do not do this because they only register a signal within a certain range, which determines presence but not spatial arrangement. While in the case of known applications of these known technologies the spatial indeterminacy and thus spatial freedom is advantageous, e.g. in the case of pairing a smartphone of a user moving freely in a living space with a loudspeaker, the spatial indeterminacy is disadvantageous in the case of a transport equipment 1 with at least one transport device 1*a* and makes important distinctions impossible. In particular, in a stack of identical transport devices 1*a*, which is not a transport equipment 1 intended for use with at least one transport device 1*a*, not to be integrated powered electronic devices 4 are spatially closer to each other than those to be integrated for use. An autonomous system integration according to the criterion of presence, spatial proximity or signal range is thus completely un-suitable, whereas the criterion of the spatial arrangement of the power-supplied electronic devices 4 on the transport equipment 1 with at least one transport device 1*a* always reliably identifies electronic devices 4 which belong together as belonging together and distinguishes them from electronic devices 4 which do not belong together, irrespective of the construction and configuration of the transport equipment 1.

Transport equipments 1 can be made up of only one or more transport devices 1*a*, one transport equipment 1 each can be defined for different applications of the same transport devices 1*a*, for example provision in a stack as the first and use for the transport of goods as the second application, and changing combinations of transport devices 1*a* to differently configured transport equipments 1 can be provided. This comprehensive flexibility and universal applicability of the transport equipments 1 is based on the ability of each transport equipment 1 to determine at least one identifier "a" 10 and at least three spatial coordinates "x", "y", and "z" for each powered electronic device 4 and to use them for system integration. Different technical means and ways have been described as examples which make this possible. The identification means 9 can show, store, and/or generate identifiers 10. QR codes or bar codes visible from the outside are particularly suitable for displaying an identification 10, whereby these are advantageously arranged at the power-supplied electronic device 4 and/or at the mounting point 8 and/or at another predetermined position which can therefore be assigned to the electronic device 4. Since transport equipments 1 are used for the transport, purchase and invoicing of goods, the security of the transport equipment 1 against manipulation is important. A high level of security can be achieved by combining visible, stored and generated identifiers. For example, a power-supplied electronic device 4 can be individualised by means of an internally stored, invisible first identifier 10, by means of a visible second identifier 10 shown to at least one detection device 5, and possibly also by means of a third identifier 10, for example a hash value, calculated using image data from the electronic device 4 and thus generated as a function of its arrangement on the transport device 1. It may be provided that these at least two identifiers 10 of a powered electronic device 4 must have values or matches provided for in order for the transport equipment 1 to support certain applications, such as moving goods from a market or billing goods. In case of malfunction or tampering, the transport equipment 1 can autonomously send a notification indicating this and/or display it via the user interface 6.

The use of more than one identifier 10 and more than one type of identifier 10 is also advantageous for robust system integration, as the following example shows: A transport equipment 1 can consist of a trolley as the first transport device 1*a* and a basket arranged on the trolley as the second transport device 1*a*. A user interface 6, which is not itself a detection device 5, is arranged on the transport trolley, and a detection device 5, which is not a user interface 6, is arranged on the basket. In the example application, a number of transport trolleys and a number of baskets are constantly changing and combined to such transport equipments 1 and separated again. As soon as a basket on a transport trolley takes up its intended position, the detection device 5 detects a visible first identifier 10 assigned to the user interface 6 and transmits this together with its own internally stored identifier 10 wirelessly. The user interface verifies the data using its internally stored second identifier 10, which is uniquely assigned to its first, visible identifier. Coincidentally there is a second basket near the transport trolley which does not belong to the transport equipment 1 and is not arranged in the intended position on the transport trolley, the detection device 5 of which also detects the visible first identifier 10 of the user interface 6. The affiliation or non-affiliation to transport equipment 1 is now determined on the basis of the spatial position data 20. The detection device 5 can be configured to transmit the detected identification 10 only if its own position relative to the visible identification means 9 showing this identification 10 is the intended position. This can be determined from the size and orientation of the identification means 9 in the field of view of the detection device 5. By means of the determination, the positions of the two power-supplied electronic devices 4 in relation to each other and to the transport equipment 1 are simultaneously determined. Furthermore, the detection device 5 can transmit image data of the detected identification means 9 to the user interface 6 and the intended position is verified by the user interface 6 on the basis of these data. The described steps for system integration are robust, simple and thus also cost-effective.

It may be provided that the operational state of the transport equipment 1 is continuously optimised by including data generated by the transport equipment 1 with at least one transport device 1*a* alone or together with further transport equipments 1 and optionally with further data processing devices, wherein the data relate in particular to the state of the at least one transport device 1*a* forming the transport equipment 1 and optionally a number of further transport devices 1*a*, the usage environment of the transport device(s) 1*a* and optionally usage profiles of individual users.

Such optimisation is extremely useful. Local lighting conditions, assortments of goods, and other data of the usage environment can be used, for example, to adapt an optical goods recognition carried out with detection devices 5 to a local environment. The usage profile of individual users is of great advantage in this context. A typical customer of a self-service shop selects only a small part of the assortment and it is therefore sufficient in the case of a user if a detection device 5 only or preferably detects the goods that come into question for this user. This drastically reduces the computing effort, since considerably fewer articles have to be differentiated between, and increases speed, reliability and user-friendliness accordingly.

Data concerning the condition of the transport device 1*a* itself can be used in particular for calibration, focusing, or for adaptation to changes. Changes can, for example, be deformations due to loading or unloading of the transport device 1*a*, positional changes of parts as a result of stacking transport devices 1*a*, adding or removing parts, etc.

Finally, the useful multiple applicability of the inventive solution is described using a practical example:

A first transport equipment 1 in the form of a shopping trolley is produced in series. The powered electronic devices 4 of this transport equipment 1 are configured to check the quality of the transport equipment 1, especially manufacturing tolerances, correct assembly, the quality of the surface coating and the presence of all parts. The user interface 6 of each transport equipment 1 indicates possible defects. Based on the data transmitted by the transport equipments 1, a test report is generated before shipment, confirming that only faultless shopping trolley are delivered.

After the transport is completed, the shopping trolleys are taken over by the customer. Two of the shopping trolleys indicate transport damages via the user interface 6. On the basis of the data transmitted by the transport equipment 1, a further inspection report is generated, which determines the transport damage and confirms that the delivery is otherwise faultless. The damages can be clearly assigned to the transport on the basis of both protocols.

The customer, a retailer, uses hand baskets as a second transport equipment 1 in his store, which are combined by some visitors to the store with the shopping trolleys to form a third transport equipment 1, but are also used independently, just like the shopping trolleys. The same system integration to a third transport equipment 1 as well as its repeated dissolution and separate use of shopping trolleys and baskets is carried out automatically by the transport equipments 1. A first user places the basket incorrectly, e.g. unsafe, on the shopping trolley. The user interface 6 indicates to the user that the placement of the basket is unsafe and asks for correction. The user corrects the position and can start shopping with a safe transport device 1. A second user attempts to hide goods under the bottom of the basket with the aim of shoplifting. The incorrect position of the basket on the shopping trolley, which is typical for this case, is detected and the transport device 1 informs security personnel by means of wireless data transmission. A third user exceeds the permissible loading weight of the transport equipment 1 and the resulting deformation is registered by the transport equipment 1. The transport equipment 1 warns the user and transmits data of any damage caused. An electronic device 4 of the transport equipment 1 is damaged and must be replaced. The transport equipment 1 is configured to detect the damage and to transmit data in analogy to the detection of production quality defects or transport damages. After several years in operation, galvanised metal parts of a shopping trolley are 50% corroded. This is detected by the detection device 5 of a basket forming a transport equipment 1 together with the shopping trolley, and the transport equipment 1 transmits relevant data so that the parts can be re-galvanised or replaced. A basket is broken and unusable. Since it is impossible to correctly position the broken basket on the shopping trolley, this is detected by the transport equipment 1 and the basket can be replaced.

Optionally, a purchasing customer may temporarily integrate his or her own mobile communication device into the transport equipment 1, preferably in accordance with the procedure described below, which can be carried out following the procedure described in claim 15, i.e. using an already manufactured transport equipment 1. For this purpose, in a first step, a mobile communication device individualised by an identification means 9 is arranged at a position of a first transport equipment 1 provided for this purpose, In a second step, caused by the first step, the identifier 10 and the respective spatial position of the mobile communication device on the transport equipment 1 are determined by the first transport equipment 1 such that they can be assigned to one another. In a third step, caused by the second step, a wireless data connection is set up between the mobile communication device and the first transport equipment 1 and a second transport equipment 1 is formed with the mobile communication device as a further electronic device 4. Optionally the wireless data connection between the mobile communication device and the transport equipment 1 is maintained or not when the mobile communication device is removed again from the intended position on the transport equipment 1, wherein the first transport equipment 1 is formed again by the optional removal of the mobile communication device, In a fourth step, a third transport equipment 1 which is identical to the stack is formed by stacking at least one transport device 1*a* of the first transport equipment 1 with similar transport devices 1*a*, the formation of the third transport equipment 1 at the latest causing the wireless data connection between the mobile communication device and the transport equipment 1 to be disconnected. The described procedure is not only usefully applicable in retail trade, but also in logistics and industry.

The exemplary applications and the integration of the transport equipment in different processes mean an enormous gain in efficiency and information. Numerous other applications not described here can be found according to the above explanations. This paper shows a way to realise and operate the very heterogeneous known and possibly further transport equipments 1 by using highly uniform technical means and process steps.

The invention claimed is:

1. Transport equipment with at least one transport device which is individualized by an identification means, which has at least one goods depositing device and at least one handle and which can be stacked with respectively identical transport devices, wherein the transport equipment has at least two power-supplied electronic devices arranged on an identical and/or on different transport devices, of which at least one performs the function of a user interface and at least one performs the function of a detection device, and which each have integrated data-processing means and means for wireless data transmission, in that each power-supplied electronic device can be individualized by at least one identification means using a machine-detectable identifier, in that the power-supplied electronic devices are arranged on the transport equipment in such a way that the spatial position of at least one further electronic device on the transport equipment can be determined by the at least one detection device, and in that the transport equipment is configured to determine the respective identifier and the respective spatial position on the transport equipment using the data-processing means and the means for wireless data transmission for at least two of the power-supplied electronic devices such that they can be assigned to one another.

2. Transport equipment according to claim 1, wherein the transport equipment is a stack consisting of transport equipments.

3. Transport equipment according to claim 1, wherein the at least one transport device is a shopping trolley, a platform trolley, a luggage trolley, a roll container, a tray trolley, a roller basket, a shopping basket, a tray, or a hand truck.

4. Transport equipment according to claim 1, wherein the at least two electronic devices are arranged on the handle and/or on the goods depositing device and/or on an optionally present chassis and/or on an optionally present child seat device of the at least one transport device and occupy two different stacking dead spaces in the stacking compound of several identical transport devices.

5. Transport equipment according to claim 1, wherein at least one electronic device is positively connected to the handle or to a goods storage device or to the optionally available chassis of the at least one transport device or to the optionally available child seat device in such a way that the positive connection forces the intended position of the electronic device to further electronic devices arranged on the at least one transport device.

6. Transport equipment according to claim 1, wherein at least two electronic devices differ only by their housing and their identification.

7. Transport equipment according to claim 1, wherein the transport equipment is configured to transmit from a detection device its own identification and/or the identification of a further electronic device together with image data generated by this detection device or as part of the image data to a further electronic device.

8. Transport equipment according to claim 1, wherein the spatial arrangement of at least one power-supplied electronic device is determined using an optical and/or acoustic, actively generated or passively available signal, by means of which an identifier is also encoded and transmitted.

9. Transport equipment according to claim 1, wherein a first and a second spatial position is provided on the transport equipment for at least one power-supplied electronic device, wherein in both positions the electronic device is connected to the same mounting point on the at least one transport device, wherein an electrically conductive contact exists between the at least one electronic device, which assumes the first spatial position, and the mounting location, and wherein no electrically conductive contact exists between the at least one electronic device, which assumes the second spatial position, and the mounting location.

10. Transport equipment according to claim 1, wherein a wireless inductive charging device is used as a means for wireless power supply, which optionally serves only for charging a local power storage device of the respective power-supplied electronic device, or also serves as a transmitter or within the same power-supplied electronic device serves for supplying power to a transmitter which is intended for inductive power transmission to at least one further power-supplied electronic device.

11. Transport equipment according to claim 1, wherein the transport equipment is configured to use mutually associated identifiers and spatial position data of the at least two powered electronic devices to initiate, control, or terminate inductive charging processes serving to power the at least two electronic devices.

12. Transport equipment according to claim 1, wherein the transport equipment is configured to generate data concerning the state or changes of state of the transport equipment or parts of the transport equipment, in particular the presence and/or the configuration and/or the arrangement and/or the function and/or the damage or non-damage and/or the intended or not intended use.

13. Transport equipment according to claim 1, wherein the transport equipment is configured to make data concerning the past and/or present state or state changes of the transport device available to a user using the at least one user interface and/or to transmit it wirelessly to data processing devices not belonging to the transport equipment.

14. Transport equipment according to claim 1, wherein the transport equipment is configured, firstly, to continuously generate spatial position data relating to the position of at least one first electronic device with the aid of at least one first detection device, position changes being detected as a disturbance signal of a disturbance influence acting on the transport equipment, secondly, to use the generated position data to determine the effect of the disturbance on at least one second detection device and, thirdly, to calibrate and/or continuously denoise the data generated by the at least one second detection device taking into account the disturbance signal.

15. Method for the manufacturing, operating and maintaining of a transport equipment according to claim 1, wherein
in a first step, at least one further electronic device is individually detected by at least one power-supplied electronic device by means of its identification means, in that
in a second step, the at least one detection device determines the spatial position of at least one further electronic device on the transport equipment and/or that at least two detection devices determine their positions by means of the detection of a common spatial area,
wherein the first and second steps can optionally also be performed in reverse order or simultaneously or as only one step, and in that
in a third step, the transport equipment determines the respective identifier and the respective spatial position on the transport equipment using the data-processing means and the means for wireless data transmission for at least two current-supplied electronic devices such that they can be assigned to one another.

16. Method according to claim 15, wherein a transport equipment is in turn formed by the formation of a stack consisting of transport equipments.

17. Method according to claim 15, wherein from at least one power-supplied electronic device, which is a detection device, together with image data generated by this detection device or as part of the image data, the own identifier and/or the detected identifier of a further electronic device are transmitted wirelessly to a further electronic device.

18. Method according to claim 15, wherein the spatial arrangement of at least one power-supplied electronic device is determined using an optical and/or acoustic, actively generated or passively available signal, through which an identifier is also transmitted.

19. Method according to claim 15, wherein at least one power-supplied electronic device is arranged in a first spatial position at a mounting location on the at least one transport device, wherein in the first spatial position there is a current-conducting contact between the power-supplied electronic device and the mounting location, and in that the power-supplied electronic device is then arranged in a second spatial position at an identical mounting location, there being no current-conducting contact between the power-supplied electronic device and the mounting location in the second spatial position.

20. Method according to claim 15, wherein the transport equipment uses mutually assigned identifiers and spatial position data of the at least two power-supplied electronic devices for initiating, controlling, or terminating inductive charging processes which serve to supply power to the at least two electronic devices.

21. Method according to claim 15, wherein the transport device, using mutually assigned identifiers and spatial position data, generates data which relate to the state or changes in state of the transport equipment or of parts of the transport equipment, in particular the presence and/or the configuration and/or the arrangement and/or the function and/or the damage or non-damage and/or the intended or unintended use.

22. Method according to claim 15, wherein the transport equipment makes data relating to the previous and/or current state or state changes of the transport equipment available to a user using the at least one user interface and/or transmits them wirelessly to data processing devices not belonging to the transport equipment.

23. Method according to claim 15,
wherein, in a first step, the transport device continuously generates spatial position data relating to the position of at least one first electronic device with the aid of at least one first detection device, position changes being detected as a disturbance signal of a disturbance influence acting on the transport equipment,
wherein, in a second step, the generated position data are used to determine the effect of the disturbance on at least one second detection device, and
wherein, in a third step, the data generated by the at least one second detection device are calibrated and/or continuously denoised taking into account the interference signal,
wherein the three steps are preferably performed continuously parallel to each other by the transport device.

24. Method according to claim 15,
wherein, in a first step, a mobile communication device individualized by an identification means is arranged at a position of a first transport equipment provided for this purpose,
wherein, in a second step caused by the first step, the identifier and the respective spatial position of the mobile communication device on the transport equipment are determined by the first transport equipment such that they can be assigned to one another,
wherein, in a third step caused by the second step, a wireless data connection is set up between the mobile communication device and the first transport equipment and a second transport equipment is formed with the mobile communication device as a further electronic device, wherein optionally the wireless data connection between the mobile communication device and the transport equipment is maintained or not when the mobile communication device is removed again from the intended position on the transport equipment and wherein the first transport equipment is formed again by the optional removal of the mobile communication device, and
wherein, in a fourth step, a third transport equipment which is identical to the stacking compound is formed by stacking at least one transport device of the first transport equipment with similar transport devices, the formation of the third transport device at the latest causing the wireless data connection between the mobile communication device and the transport equipment to be disconnected.

\* \* \* \* \*